United States Patent [19]

Nakayama et al.

[11] Patent Number: 5,201,614
[45] Date of Patent: Apr. 13, 1993

[54] ROTARY CUTTING TOOL

[75] Inventors: Masaaki Nakayama; Masayuki Okawa, both of Ibaraki, Japan

[73] Assignee: Mitsubishi Materials Corporation, Tokyo, Japan

[21] Appl. No.: 846,617

[22] Filed: Mar. 5, 1992

[30] Foreign Application Priority Data

Mar. 7, 1991 [JP] Japan .................................. 3-12446

[51] Int. Cl.⁵ ................................................. B23C 5/22
[52] U.S. Cl. ......................................... 407/41; 407/50; 407/54; 407/109
[58] Field of Search ........................ 407/53, 54, 34, 40, 407/41, 120, 49, 107–109

[56] References Cited

U.S. PATENT DOCUMENTS

| | | | |
|---|---|---|---|
| 1,358,013 | 11/1920 | Miller | 407/41 |
| 3,481,015 | 12/1969 | Bogner | 407/41 |
| 3,987,524 | 10/1976 | Hochmuth et al. | |
| 4,329,091 | 5/1982 | Erkfritz | 407/41 |

FOREIGN PATENT DOCUMENTS

| | | |
|---|---|---|
| 2117709 | 10/1972 | Fed. Rep. of Germany . |
| 2302806 | 10/1976 | France . |
| 488513 | 4/1970 | Switzerland . |

*Primary Examiner*—Steven C. Bishop
*Attorney, Agent, or Firm*—Cushman, Darby & Cushman

[57] ABSTRACT

A rotary cutting tool is disclosed which has a tool body, a cutting insert, a clamp member and a clamp screw. The tool body has an insert-receiving recess and a clamp member-receiving aperture formed in an outer surface thereof. The insert-receiving recess has a bottom and at least two bearing walls disposed so as to be inclined with respect to each other. The clamp member-receiving aperture is disposed so as to be communicated with the recess. The cutting insert includes a plate having a front face serving as a rake surface and a rear face. The cutting insert is releasably received in the recess with the rear face being mated with the bottom, in such a manner that the front face is partly located in the clamp member-receiving aperture. The clamp member has an axis therethrough and an engagement portion. The clamp member is releasably accommodated in the clamp member-receiving aperture so as to be axially slidable, with the engagement portion being held in abutment with the front face of the cutting insert. The clamp screw is threaded into the tool body so as to be held in abutting engagement with the clamp member, to thereby press the clamp member against the insert. The clamp screw is preferably arranged such that an angle defined between the axis of the clamp member and the front face of the insert ranges from 30 degrees to 60 degrees. The clamp member is preferably arranged such that as viewed from the rake surface, the clamp member extends in a direction toward the at least two bearing walls.

10 Claims, 3 Drawing Sheets

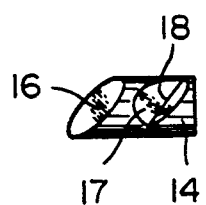
FIG.8
FIG.9
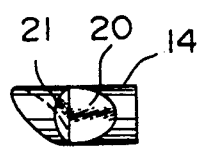
FIG.10
FIG.11
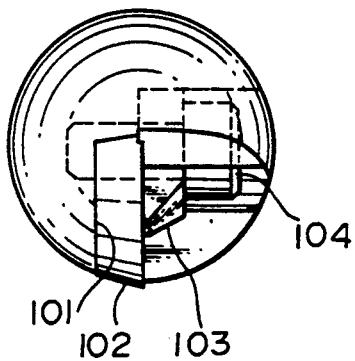
FIG.12 (PRIOR ART)
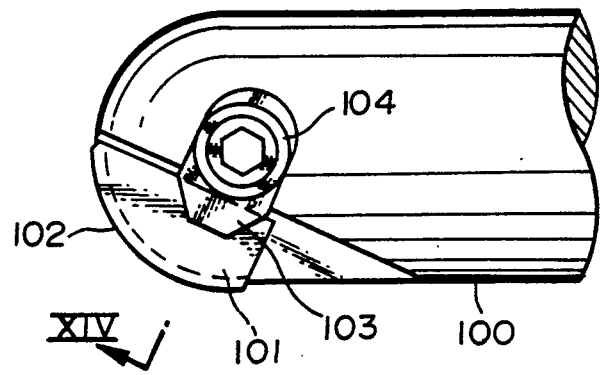
FIG.13 (PRIOR ART)
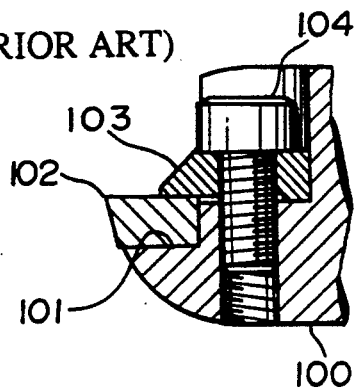
FIG.14 (PRIOR ART)

ROTARY CUTTING TOOL

BACKGROUND OF THE INVENTION

1. Field of the Invention

The present invention relates to a rotary cutting tool, and particularly to the improvements in the clamp mechanism for securing an indexable cutting insert to a tool body.

2. Prior Art

FIGS. 12 to 14 depict one conventional rotary cutting tool which includes a tool body 100 having an insert-receiving recess 101 formed therein, a cutting insert 102 received in the recess 101, a clamp block 103 provided to press the insert 102 against the recess 101 with its tip end being held in abutment with the rake surface of the insert 102, and a clamp screw 104 inserted through the clamp block 103 and threaded into the tool body 100 to press the clamp block 103 against the insert 102.

In the conventional cutting tool as described above, however, the forward end portion of the tool body 100 is largely removed in order to provide the insert-receiving recess 101 and a space for receiving the clamp block 103 and the clamp screw 104, and hence sufficient tool rigidity cannot be ensured thereat.

SUMMARY OF THE INVENTION

It is therefore an object and feature of the present invention to provide a rotary cutting tool in which a sufficiently high rigidity is possessed to the forward end portion of the tool body, while ensuring film clamping of an insert.

According to the present invention, there is provided a rotary cutting tool comprising:

a tool body having an insert-receiving recess and a clamp member-receiving aperture formed in an outer surface thereof, the insert-receiving recess having a bottom and at least two bearing walls disposed so as to be inclined with respect to each other, the clamp member-receiving aperture being disposed so as to be communicated with the recess;

a cutting insert including a plate having a front face serving as a rake surface and a rear face, the cutting insert being releasably received in the recess with the rear face being mated with the bottom, in such a manner that the front face is partly located in the clamp member-receiving aperture;

a clamp member having an axis therethrough and an engagement portion, the clamp member being releasably accommodated in the clamp member-receiving aperture so as to be axially slidable, with the engagement portion being held in abutment with the front face of the cutting insert; and a clamp screw threaded into the tool body so as to be held in abutting engagement with the clamp member, to thereby press the clamp member against the insert.

In the aforesaid rotary cutting tool, when the clamp member is caused to move into the clamp member-receiving recess by tightening the clamp screw, the insert, which is received in the insert-receiving recess, is pressed by the clamp member against the bottom and the at least two bearing walls of the insert-receiving recess, whereby the insert can be firmly retained in position. With this construction, the portion of the forward end portion of the tool body to be removed can be substantially reduced, so that the rigidity of the tool body can be enhanced. Furthermore, the secure clamping of the insert can be ensured.

BRIEF DESCRIPTION OF THE DRAWINGS

FIG. 8 is a plan view of the clamp block of FIG. 7;

FIG. 9 is an end veiw of the clamp screw of FIG. 7;

FIG. 10 is a bottom view of the clamp screw of FIG. 7;

FIG. 11 is a view of another clamp screw as seen in the direction indicated by the arrow XI in FIG. 4;

FIG. 12 is a side elevational view of a conventional rotary cutting tool;

FIG. 13 is an end view of the tool of FIG. 12; and

FIG. 14 is a cross-sectional view of the tool of FIG. 12 taken along the line XIV—XIV in FIG. 13.

DESCRIPTION OF THE PREFERRED EMBODIMENTS OF THE INVENTION

Figure 1:
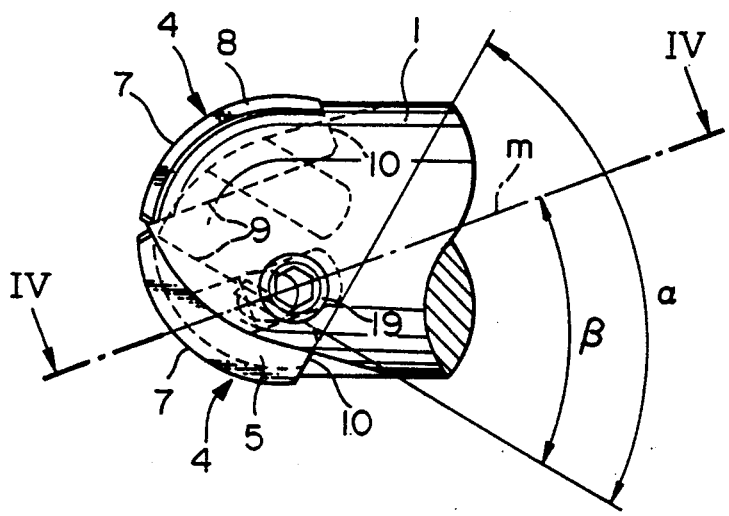
FIG. 1 is a side elevational view of a part of a rotary cutting tool in accordance with an embodiment of the present invention.
Figure 2:
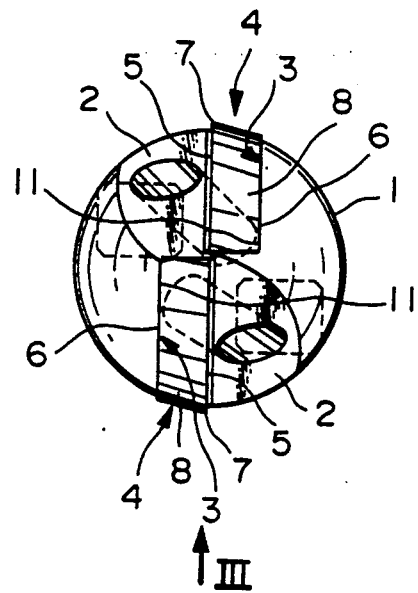
FIG. 2 is an end view of the cutting tool of FIG. 1.
Figure 3:
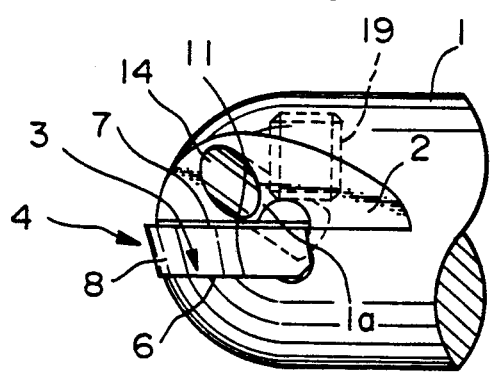
FIG. 3 is a side-elevational view of the cutting tool of FIG. 1 as seen in the direction indicated by the arrow III in FIG. 2.

FIGS. 1 to 6 depict an end mill in accordance with an embodiment of the present invention, which comprises an end mill body 1 of a generally cylindrical shape having a generally hemispherical forward end portion. Diagonally opposite portions in the forward end portion are removed to provide a pair of chip pockets 2, and an insert-receiving recess 3 is formed in the wall of each chip pocket 2 which is facing in a direction of rotation of the end mill body 1. A pair of cutting inserts 4 are attached to the insert-receiving recesses 3, respectively.

Each of the inserts 4 comprises a plate including a front face serving as a rake surface 5 and a planar rear face serving as a seating face 6. Defined between the front and rear faces are a curved side face 8 and planar side faces 9 and 10 extending from the opposite ends of the curved side face and intersecting each other so as to define so as to define a right angle therebetween. The marginal ridge defined by the intersection of the curved side face 8 with the front face serves as an arcuate cutting edge of a generally quadrantal shape, and the curved side face 8 intersects the rake surface 5 at an acute angle formed therebetween. The side faces 9 and 10 are formed so as to intersect the rake surface 5 at a right angle.

Each insert-receiving recess 3 has a bottom 11 and bearing walls 12 and 13 extending from the bottom so as to define a right angle therebetween, and each insert 4 is received in a respective recess 3 in such a manner that the seating face 6 and th adjacent side faces 9 and 10 are held in contact with the bottom 11 and the bearing walls 12 and 13, respectively. A clamp member-receiving aperture 15 is formed in each of the chip pockets 2 in such a manner that its longitudinally intermediate portion is in open-communication with the insert-receiving recess 3. In addition, that portion of the end mill body 1 between the outer end of the clamp member-receiving aperture and the intermediate opened portion, i.e., the portion having a width indicated by n in FIG. 4, serves as a bearing portion 1a.

Figure 4:
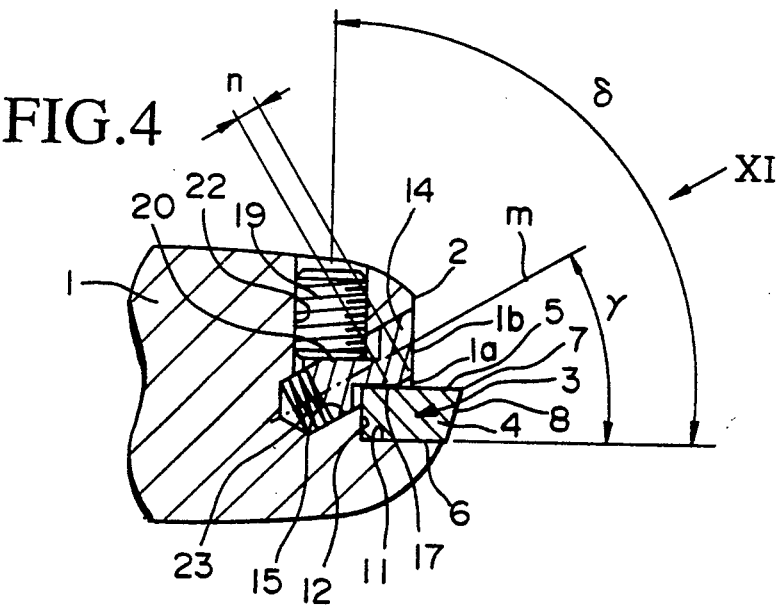
FIG. 4 is a cross-sectional view of the cutting tool of FIG. 1 taken along the line IV—IV in FIG. 1.
Figure 5:
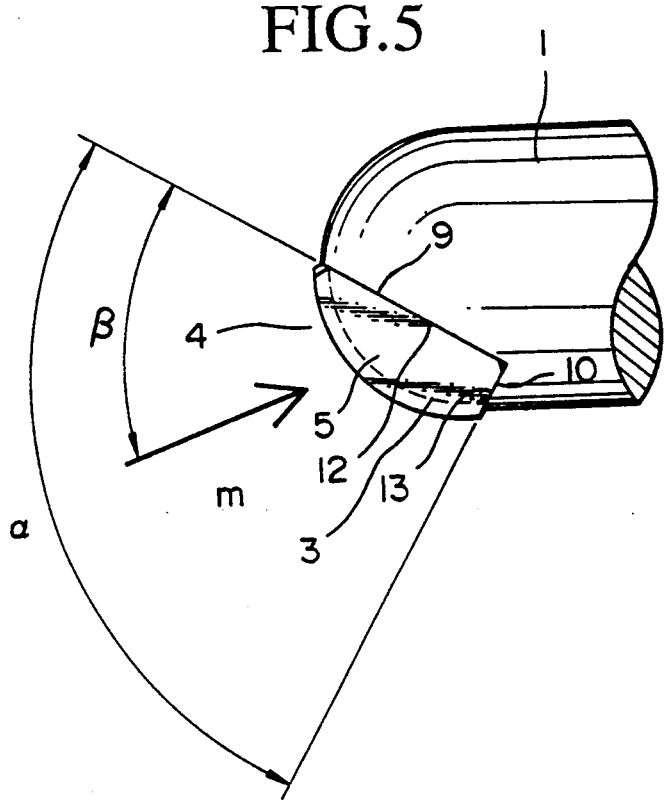
FIG. 5 is a view showing the relationship between bearing walls of insert-receiving recess and the axis of a clamp block.
Figure 6:
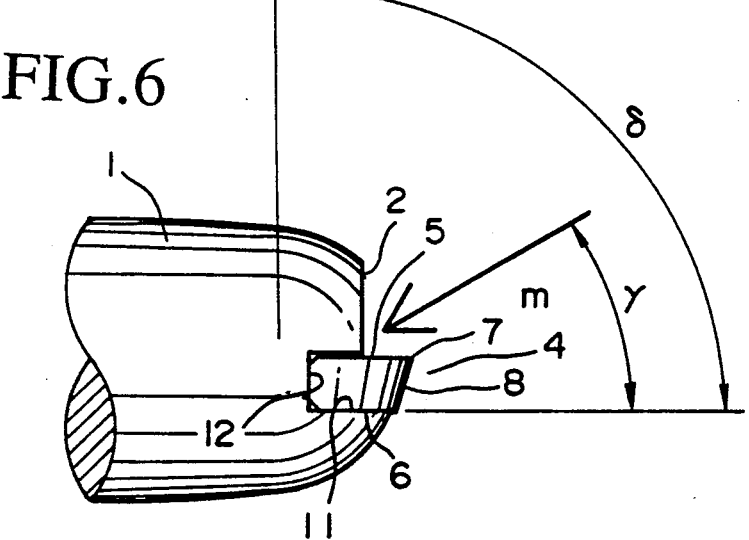
FIG. 6 is a view showing the relationship between the bottom of the insert-receiving recess and the axis of the clamp screw.
Figure 7:
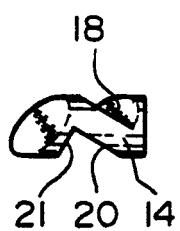
FIG. 7 is a side-elevational view of a clamp block.

As shown in FIGS. 7 to 9, a clamp member or block 14 is of a generally cylindrical shape, and has an inclined face 16 formed at one end thereof. A first notch 18, which defines a face serving as an abutment face 17 to be held in abutment with the insert 4, is formed in the outer peripheral surface of the clamp member 14 generally at the same side as the inclined face 16, whereas a second notch 21, which has a face serving as an abutment face 20 to be held in abutment with the clamp screw 19, is formed in the outer peripheral surface at a position diametrically opposite to that of the first notch 18. Furthermore, as best shown in FIG. 4, an internally threaded hole 22 into which the aforesaid clamp screw 19 is threaded is formed in the forward end portion of the end mill body 1 as to be in open communication with the clamp member-receiving aperture 15. In addition, a compression coil spring 23 is accommodated in the clamp member-receiving aperture 15 in order to resiliently urge the clamp member 14 outwardly.

An angle $\alpha$ defined between the bearing walls 12 and 13 of the insert receiving recess 3 is set to the range between 30 degrees and 150 degrees (90 degrees in the illustrated embodiment), and an angle $\beta$ defined between the axis m of the clamp member 14 and the bearing wall 9 is set so as to satisfy the relationship of $\beta = \alpha/2 \pm 10$ degrees. Moreover, and angle $\gamma$ defined between the axis m of the clamp member 14 and the bearing bottom 11 of the insert-receiving recess 3 is set to the range of between 30 degrees and 60 degrees, and an angle $\delta$ defined between the bottom 11 of the insert-receiving recess 3 and the axis of the clamp screw 19 is set such that the difference $\delta - \gamma$ ranges from 30 degrees to 60 degrees.

For securing the cutting insert 4 to the end mill body 1, the clamp screw 19 is first fastened, and then the lower end of the clamp screw 19 is brought into abutting engagement with the abutment face 20 of the first notch 21 of the clamp member 14, whereby the clamp member 14 is caused to move inwardly against the resilient force of the spring 23. As a result, the abutment face 17 of the second notch 18 of the clamp member 14 is brought into abutting engagement with the rake surface 5 of the cutting insert 4 accommodated in the insert-receiving recess 3, and hence the cutting insert 4 is firmly secured to the end mill body 1.

In the foregoing, the angle $\gamma$ defined between the axis m of the clamp member 14 and the bottom 11 of the insert-receiving recess 3 is set to range between 30 degrees and 60 degrees, and as viewed from the rake surface, the clamp member 14 extends in a direction toward the at least two bearing walls, i.e., the axis of the clamp member 14 exists within the region bounded by the two bearing walls 12 and 13 of the insert-receiving recess 3. In other words, the angle $\beta$ defined between the axis m of the clamp member 14 and the bearing wall 9 is set so as to be smaller than the angle $\alpha$. Accordingly, the seating face 6 and the side faces 9 and 10 of the cutting insert 4 are brought into firm abutting engagement with the bottom 11 and the bearing walls 12 and 13 of the insert-receiving recess 3, respectively, and hence the insert 4 is prevented from shifting during the cutting operation.

Furthermore, when the insert 4 is exchanged for a new one, the clamp screw 19 is loosened. Then, the inner end of the clamp screw 19 is disengaged from the abutment face 20 of the notch 21 of the clamp member 14, so that the clamp member 14 is caused to move outwardly due to the resilient force of the spring 23. As a result, the abutment face 17 of the notch 18 of the clamp member 14 is disengaged from the rake surface 5 of the cutting insert 4. Thus, the insert 4 can be easily released from the insert-receiving recess 3. Even after the insert 4 is released from the recess 3, the clamp member 14 is properly kept in the clamp member-receiving aperture 15 since it is prevented from falling toward the recess 3 due to the presence of the bearing portion 1a. Therefore, a new cutting insert can be easily received in and attached to the recess 3.

Thus, in the illustrated embodiment, the insert 4 can be easily released and secured, and additionally a firm securing of the insert 4 can also be ensured.

Although in the above embodiment, the bearing portion 1a is provided in order to prevent the clamp member 14 from falling toward the recess 3 when the insert 4 is released. However, since it is possible to make the length of the clamp member 14, i.e., the length of the inserted portion of the member, sufficiently great, the clamp member 14 does not fall into the recess 3 even though the bearing portion 1a is not provided. Accordingly, the formation of the bearing portion 1a is not essential. Furthermore, as shown in FIG. 11, the clamp member 14 may be modified so as to have an elliptical cross-sectional shape. In this case, the abutment faces 17 and 20 of the clamp member 14 may be enlarged, so that the securing ability of the cutting insert can be further improved.

As described above, in the cutting tool of the present invention, the clamp member-receiving aperture is formed so as to be communicated with the insert-receiving recess, and the clamp member is releasably accommodated in the clamp member-receiving aperture so as to be axially slidable. Thus, when the clamp member is caused to move into the clamp member-receiving recess by tightening the clamp screw, the insert, which is received in the insert-receiving recess, is pressed by the clamp member against the bottom and the two bearing walls of the insert-receiving recess, whereby the insert can be firmly retained in position. With this construction, the portion of the forward end portion of the tool body to be removed can be substantially reduced, so that the rigidity of the tool body can be enhanced. Furthermore, the secure clamping of the insert can be ensured.

Obviously many modifications and variations of the present invention are possible in the light of the above. It is therefore to be understood that within the scope of the appended claims, the invention may be practiced otherwise than as specifically described.

What is claimed is:

1. A rotary cutting tool comprising:
   a tool body having an insert-receiving recess and a clamp member-receiving aperture formed in an outer surface thereof, said insert-receiving recess having a bottom and at least two bearing walls disposed so as to be inclined with respect to each other, said clamp member-receiving aperture having an immediate portion formed in open communication with said insert receiving recess, said tool body having a bearing portion defined between an opening end of said clamp member-receiving aperture and said intermediate portion of said clamp member-receiving aperture;

a cutting insert including a plate having a front face serving as a rake surface and a rear face, said cutting insert being releasably received in said recess with said rear face being mated with said bottom, said insert being partly located in said intermediate portion of said clamp member-receiving aperture;

a clamp member having an axis therethrough and an engagement portion, said clamp member being releasably accommodated in said clamp member-receiving aperture so as to be axially slidable, with said engagement portion being held in abutment with said front face of said cutting insert; and a clamp screw threaded into said tool body so as to be held in abutting engagement with said clamp member, to thereby press said clamp member against said insert, said clamp member having first and second notches formed therein, said first notch having a face defining a first abutment face held in abutment with said insert, said second notch having a face defining a second abutment face to be held in abutment with said clamp screw.

2. A rotary cutting tool as recited in claim 1, wherein said clamp screw is arranged such that an angle defined between said axis of said clamp member and said front face of said insert ranges from 30 degrees to 60 degrees, said clamp member being arranged such that as viewed from said rake surface, said clamp member extends in a direction toward said at least two bearing walls.

3. A rotary cutting tool as recited in claim 2, wherein said two bearing walls are disposed such that as viewed from said rake surface of said cutting insert, an angle $\alpha$ defined between said bearing walls ranges from 30 degrees to 150 degrees.

4. A rotary cutting tool as recited in claim 3, wherein said clamp screw is arranged such that as viewed from said rake surface of said cutting insert, an angle B defined between said axis of said clamp member and one of said two bearing walls satisfies the relationship of $62 = \alpha/2 \pm$ degrees.

5. A rotary cutting tool as recited in claim 4, wherein said clamp member is disposed such that an angle $\gamma$ defined between an axis m of the clamp member and said bottom of the insert-receiving recess is set to a range of between 30 degrees and 60 degrees.

6. A rotary cutting tool as recited in claim 5, wherein said clamp member is arranged such that the difference defined by $\delta - \gamma$ ranges from 30 degrees to 60 degrees, where $\delta$ denotes an angle defined between the bottom of the insert-receiving recess and the axis of the clamp screw.

7. A rotary cutting tool as recited in claim 3, further comprising a resilient member accommodated in said clamp member-receiving aperture for urging said clamp member outwardly.

8. A rotary cutting tool as recited in claim 1, wherein said clamp screw is of a generally cylindrical shape, said first and second notches being arranged in diametrically opposite relation to each other.

9. A rotary cutting tool as recited in claim 3, wherein said tool body includes an internally threaded hole into which said clamp screw is threaded, said threaded hole being formed so as to be in open communicaton with said clamp member-receiving aperture.

10. A rotary cutting tool as recited in claim 3, wherein said clamp member is of an elliptical cross-sectional shape.

* * * * *